(12) United States Patent
Moonka et al.

(10) Patent No.: US 8,843,514 B1
(45) Date of Patent: Sep. 23, 2014

(54) IDENTIFIER MATCHING EXCHANGE

(75) Inventors: Rajas Moonka, San Ramon, CA (US); Scott Spencer, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/601,807

(22) Filed: Aug. 31, 2012

(51) Int. Cl.
*G06F 17/30* (2006.01)

(52) U.S. Cl.
USPC .............. 707/769; 707/758; 707/E17.124

(58) Field of Classification Search
CPC .......... G06Q 30/02; G06Q 30/0241; G06F 17/30867; G06F 17/30876
USPC .................... 707/769, 758, E17.124
See application file for complete search history.

(56) References Cited

U.S. PATENT DOCUMENTS

| | | | |
|---|---|---|---|
| 7,565,402 B2 * | 7/2009 | Schneider | 709/203 |
| 7,809,785 B2 * | 10/2010 | Appleton et al. | 709/201 |
| 7,860,883 B2 * | 12/2010 | Hinton et al. | 707/769 |
| 8,135,626 B2 * | 3/2012 | Das et al. | 705/26.4 |
| 8,250,095 B2 * | 8/2012 | Wu et al. | 707/783 |
| 8,291,176 B2 * | 10/2012 | Hilland et al. | 711/152 |
| 8,364,682 B1 * | 1/2013 | Gershony et al. | 707/739 |
| 2002/0065901 A1 * | 5/2002 | Goodwin et al. | 709/218 |
| 2002/0082974 A1 * | 6/2002 | Berstis | 705/37 |
| 2005/0144242 A1 * | 6/2005 | Marston et al. | 709/206 |
| 2005/0228726 A1 * | 10/2005 | Ito et al. | 705/26 |
| 2006/0004649 A1 * | 1/2006 | Singh | 705/37 |
| 2007/0240206 A1 * | 10/2007 | Wu et al. | 726/8 |
| 2008/0183561 A1 | 7/2008 | Zohar et al. | |
| 2008/0235383 A1 * | 9/2008 | Schneider | 709/229 |
| 2008/0298342 A1 * | 12/2008 | Appleton et al. | 370/351 |
| 2010/0145809 A1 | 6/2010 | Knapp et al. | |
| 2010/0228597 A1 * | 9/2010 | Das et al. | 705/10 |
| 2010/0228635 A1 * | 9/2010 | Ghosh et al. | 705/14.71 |
| 2010/0228641 A1 * | 9/2010 | Das et al. | 705/26 |
| 2010/0228642 A1 * | 9/2010 | Baker et al. | 705/26 |
| 2010/0268700 A1 * | 10/2010 | Wissner et al. | 707/706 |
| 2011/0060905 A1 * | 3/2011 | Stack et al. | 713/167 |
| 2011/0246267 A1 * | 10/2011 | Williams et al. | 705/14.4 |
| 2011/0246297 A1 * | 10/2011 | Buchalter et al. | 705/14.53 |
| 2011/0246298 A1 * | 10/2011 | Williams et al. | 705/14.53 |
| 2012/0042042 A1 * | 2/2012 | Winkler et al. | 709/217 |
| 2012/0054025 A1 * | 3/2012 | Agarwal et al. | 705/14.48 |
| 2012/0054043 A1 * | 3/2012 | Agarwal et al. | 705/14.71 |
| 2012/0059716 A1 * | 3/2012 | Agarwal et al. | 705/14.52 |
| 2012/0059809 A1 * | 3/2012 | Furman et al. | 707/705 |
| 2012/0109734 A1 * | 5/2012 | Fordyce et al. | 705/14.25 |
| 2012/0136728 A1 | 5/2012 | Hsiung et al. | |
| 2012/0254949 A1 * | 10/2012 | Mikkonen et al. | 726/4 |
| 2012/0278467 A1 * | 11/2012 | Schneider | 709/223 |
| 2012/0290427 A1 * | 11/2012 | Reed et al. | 705/26.2 |
| 2012/0311017 A1 * | 12/2012 | Sze et al. | 709/202 |
| 2013/0031203 A1 * | 1/2013 | Bestfleisch et al. | 709/217 |
| 2013/0212120 A1 * | 8/2013 | Ke et al. | 707/767 |

\* cited by examiner

*Primary Examiner* — Phuong Thao Cao
(74) *Attorney, Agent, or Firm* — Foley and Lardner LLP; John D. Lanza

(57) ABSTRACT

A computerized method, system for, and computer-readable medium operable to: initiate an algorithmic model with a query. The method comprises sending a match-coding request using the query in the algorithmic model. Use the match-coding request to identify a first identifier (ID) from a first domain. The method comprises mapping the first ID from the first domain in a same browser to a matching second ID in a second domain. The method comprises returning the matched IDs to at least one domain owner associated with the match-coding request.

17 Claims, 5 Drawing Sheets

IDENTIFIER MATCHING EXCHANGE

BACKGROUND

The present disclosure relates generally to content provided over the Internet as well as ways to manage identifiers such as device identifiers, user identifiers, partner identifiers, cookies, web cookies, browsing cookies, and/or third-party cookies.

Pieces of data that identify a user during a browsing session may be specific to a particular web-site at the domain level, e.g., www.*****.com. A domain owner or domain owner that has a list of identifiers associated with one domain (e.g., their home page) may wish to use that list of identifiers in another domain (a domain specializing in particular types of content) in order to broaden its customer base and optimize the exposure of its products. To use a list of identifiers from one domain on another domain, the list must be converted, on an identifier-by-identifier basis from the original domain to the other domain. A domain is also a generic term which can refer to internet domains or any ID space, for example, a mobile application can be classified as a domain. To create this identifier by identifier match, a redirect protocol may be employed, which allows the identifier from one domain to be passed to another domain to create the match, usually by means of the user or customer clicking on an image. However, this redirect protocol takes time and potentially creates a page load latency which can adversely effect the consumer experience of browsing websites.

SUMMARY

In one implementation, provided are a computerized method and tangible computer-readable medium which are operable to perform instructions including first, initiating an algorithmic model with a query. Then, a match-coding request is sent using the query in the algorithmic model. Next, the match-coding request is used to identify a first identifier (ID) from a first domain. Afterwards, the first ID is mapped from the first domain in a same browser to a matching second ID in a second domain. Then, the matched IDs are returned and compensation is provided to at least one domain owner associated with the match-coding request.

In one implementation, provided is a system having a processor capable of performing instructions, the instructions including first, initiating an algorithmic model with a query. Then, a match-coding request is sent using the query in the algorithmic model. Next, the match-coding request is used to identify a first ID from a first domain. Afterwards, the first ID is mapped from the first domain in a same browser to a matching second ID in a second domain. Then, the matched IDs are returned and compensation is provided to at least one domain owner associated with the match-coding request. In one implementation, compensation is provided to the at least one domain owner, wherein the at least one domain owner includes at least one of the first domain and the second domain.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

Figure 1:
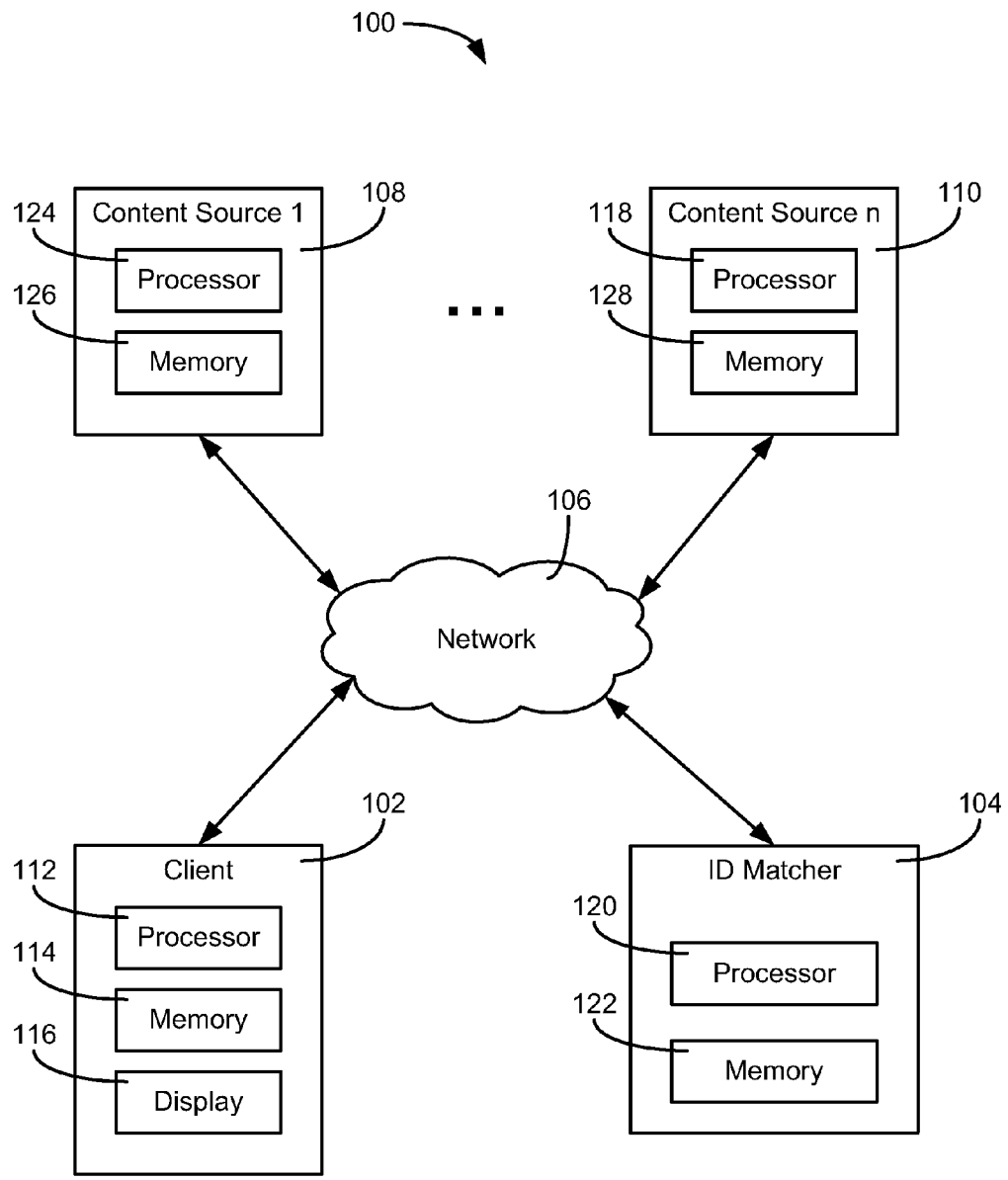
FIG. 1 is a block diagram of a computer system in accordance with an aspect of the present disclosure.

An image used to invoke a redirect script by the browser from one domain to another domain may be known as a "pixel" because it can be a transparent image that is one pixel by one pixel in size. When the pixel is loaded, a domain owner such as an affiliate or publisher may be informed that the image loaded on their page and may get rewarded for the lead that caused the loading of that image. The pixel may be a GIF (Graphics Interchange Format) or JPEG (Joint Photographic Experts Group) picture. The redirect script may be coded in JavaScript, a script, and/or any other HTTP accessible language such as, for example, personal home page (PHP) or PHP hypertext preprocessor (PHP), Ruby, Perl, active server pages (ASP), extensible markup language (XML), Java and so on.

When a pixel "fires" or becomes loaded, it successfully sends back information on the successfully completed transaction (e.g., an image loading or a script executing) to the domain owner so that the domain owner may receive credit for that transaction. In one implementation, the information of the successfully completed transaction may include any account number belonging to the domain owner, the date and time of the transaction, the IP address of the user or visitor loading the confirmation page, and the amount of commission earned from a successful referral.

According to one aspect of the present disclosure, a referral back to the domain owner may be provided by a query. However, that query may obfuscate the referrer on which that query resides. The query may also be tied to an algorithmic model such as an auction process bidding on a unique identifier such as a cookie, or third-party cookie associated with the page view of that confirmation page. In one implementation, an identifier match may be performed via a redirected image asset or image redirect protocol such as a match-coding pixel to a given participant based on an auction.

According to one aspect of the present disclosure, the algorithmic model used may be an auction process similar to a "content exchange" program or technology platform that facilitates the bidded buying and selling of online content from multiple domain owners or content networks. In one implementation, the auction process might follow a generalized second price auction (GSP) model with a price floor. Specifically, the second price auction may be based on the generalized second-price auction model from game theory or economics, a non-truthful auction mechanism for multiple items that may be a natural extension of the Vickrey auction, but may not retain properties of the Vickrey auction such as truthfulness of bidding value. According to one implementation, a Vickrey auction is a type of sealed-bid auction or sealed second-price auction where bidders submit written bids without knowing the bid of the other people in the auction, and in which the highest bidder wins, but the price paid may be the second-highest bid, which may give bidders an incentive to bid the true value of the auction items. Thus, the identity of the other bidders and their bids is effectively sealed. For example, a second price auction might be used for keyword auctions where sponsored search slots for various content searchable online may be sold on an auction basis.

In one implementation, the algorithmic model used may be a rate card that assigns a fixed rate based on any given parameter, such as an identifier that hasn't been seen in less than a certain predetermined time period. In some implementations, the algorithmic model that may be used might return results to a domain owner based on other dimensions such as how fresh or recent an identifier is, the age of the identifier, the uniqueness of the identifier, or any other chosen criteria to evaluate how the content or data used in the algorithmic model is priced. In some implementations, the algorithmic model can be an auction that is not listed or described in the present disclosure, but still provides similar behavior.

According to one aspect of the present disclosure, a domain may be a domain name of a website, such as "***.com" in www.*.com. In one implementation, a domain may also be a namespace. A namespace may be a container for a set of identifiers or names of different cookies, for example. A domain may also include a domain identifier, such as "*.com" in the URL www.*.com. Likewise, a namespace may include a namespace identifier as well as a local name. In the context of domain names, for example, the namespace identifier could be abc.com while the local name would be "www" or the host name. For XML, the namespace identifier could be http://www.*.org/####/xhtml and the local name could also be the "body" tag in an XML script having the tag <xhmtl:body>. In one implementation, each identifier may correspond to their own namespace. In one implementation, a domain owner can include a domain identifier and a local name, and the domain identifier may include at least one of a URL, a number index, a hashtag, a code, or any other type of identification as discussed above. In one implementation, the algorithmic model process may allow bidders to fill in gaps in their identifier namespace mappings. In one implementation, a domain is also a generic term which can refer to internet domains or any ID space, for example, a mobile application can be classified as a domain even though it may not possess a domain.

According to one aspect of the present disclosure, the compensation to domain owners may be improved and minimum compensation levels may be dispensed. In one implementation, domain owners can set different thresholds or minimums for different bidders and the firing of pixels may be frequency capped so that users are not inundated with the same request over and over again. In one implementation, this system may be supported in a system similar to a content exchange program where a special format is created with a special wrapper code to mask the publisher or domain owner host. In one implementation, the domain owner could be the owner of a first domain where an ID is acquired, the owner of a second domain where the ID is matched, or the owner of any other domain.

According to one aspect of the present disclosure, the pixels may be fired in content requests. In one implementation, the content exchange system may provide the matching service, or run in the same content requests. In one implementation, the pixels may be matched on the inventory of the domain owner (e.g., a network or coop may be created around the matched pixels across all the different domain owner instances). In one implementation, third-party domain owners may use the other publisher or domain owner partners from who they originate content or data to also provide ID-syncing capabilities. Domain owners in this model may have already agreed to provide content so ID-syncing may just be already attached to business models already provided by domain owners.

FIG. 1 is a block diagram of a computer system 100, in accordance with an aspect of the present disclosure. System 100 includes a client 102 which communicates with other computing devices via a network 106. Client 102 may execute a web browser or other application (e.g., a video game, a messaging program, etc.) to retrieve content from other devices over network 106. For example, client 102 may communicate with any number of content sources 108, 110 (e.g., a first content source through nth content source), which provide electronic content to client 102, such as web page data and/or other content (e.g., text documents, PDF files, and other forms of electronic documents). In some implementations, computer system 100 may also include a cookie auction matcher configured to match identifiers such as cookies or match fired pixels provided by a content source 108, 110, to instruct the client 102 to perform an action, such as rewarding a particular domain owner.

Network 106 may be any form of computer network that relays information between client 102, content sources 108, 110, and identifier (ID) auction matcher 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different types of electronic devices configured to communicate via network 106 (e.g., a laptop computer, a desktop computer, a tablet computer, a smartphone, a digital video recorder, a set-top box for a television, a video game console, combinations thereof, etc.). Client 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which displays web pages and other forms of content received from content sources 108, 110 and/or ID matcher 104.

Content sources 108, 110 may be one or more electronic devices connected to network 106 that provide content to client 102. For example, content sources 108, 110 may be computer servers (e.g., FTP servers, file sharing servers, web servers, etc.) or combinations of servers (e.g., data centers, cloud computing platforms, etc.). Content may include, but is not limited to, advertisements on web pages, pixels, tags, scripts, web page data, a text file, a spreadsheet, an image file, social media data (posts, messages, status updates), media files, video files, and other forms of electronic documents. Similar to client 102, content sources 108, 110 may include processing circuits comprising processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

ID matcher 104 may be one or more electronic devices connected to network 106 and configured to analyze and match fired pixels or cookies associated with client 102 and/or other clients and/or content sources 108, 110. ID matcher 104 may be a computer server (e.g., FTP servers, file sharing servers, web servers, etc.) or a combination of servers (e.g., a data center, a cloud computing platform, etc.). ID matcher 104 may also include a processing circuit including a processor 120 and a memory 122 that stores program instructions executable by processor 120. In cases in which ID matcher 104 is a combination of computing devices, processor 120 may represent the collective processors of the devices and memory 122 may represent the collective memories of the devices. In other implementations, the functionality of ID matcher 104 may be integrated into content sources 108, 110 or other devices connected to network 106. ID matcher 104 may be on a server side or client side of a network, and may be part of a personal computer, smart TV, smart phone, or other client-side computing device.

ID matcher 104 may store user identifiers to represent users of computing system 100. A user identifier may be associated with one or more client identifiers. For example, a user identifier may be associated with the network address of client 102 or a cookie that has been set on client 102, or a network address or cookie of one of the content sources 108, 110. A user identifier may be associated with any number of different client identifiers. For example, a user identifier may be associated with a device identifier for client 102 and another client device connected to network 106 or a content source 108, 110. In other implementations, a device identifier for client 102 may itself be used in computing system 100 as a user identifier.

A user of client 102 may elect or choose to allow ID matcher 104 to identify and store data relating to client 102 and the user. For example, the user may elect to receive content or data processed or analyzed by ID matcher 104 that may be more relevant to the user's actions. In one implementation, a client identifier and/or device identifier for client 102 may be anonymized and contain no personally-identifiable information about the user of client 102. Thus, the user of client 102 may have control over how information is collected about the user and used by ID matcher 104, in various implementations.

A set of one or more user identifiers may be evaluated by ID matcher 104 to determine how strongly a particular signal relates to the user identifiers in the set. The set may be selected randomly or based on one or more characteristics of the set. For example, the set may be selected for evaluation based on age ranges of a certain set (e.g., user identifiers associated with a particular range of ages which may be more likely to have certain eye conditions), based on one or more signals associated with the identifiers (e.g., user identifiers associated with particular eye conditions, particular medical conditions, particular eye or action settings or preferences), any other characteristic, or a combination thereof. In some implementations, ID matcher 104 may determine the strength of association between a signal and the set using a statistical measure of association. For example, ID matcher 104 may determine the strength of association between the set and a particular signal using a point-wise mutual information (PMI) score, a term-frequency inverse-document-frequency (TF-IDF) score, a mutual information score, a Kullback-Leibler divergence score, any other statistical measure of association, or combinations thereof.

Relevant data may be provided to client 102 by content sources 108, 110 or ID matcher 104. For example, ID matcher 104 may select relevant content from content sources 108, 110 such as specific fired pixels or cookies to the client 102 for rewarding particular domain owners. In another example, ID matcher 104 may provide the selected content to client 102, via code, instructions, files or other forms of data. In some implementations, ID matcher 104 may select content stored in memory 114 of client 102. For example, previously provided content may be cached in memory 114, content may be preloaded into memory 114 (e.g., as part of the installation of an application), or may exist as part of the operating system of client 102. In such a case, ID matcher 104 may provide an indication of the selection to client 102. In response, client 102 may retrieve the selected content from memory 114 and display it on display 116.

Figure 2:
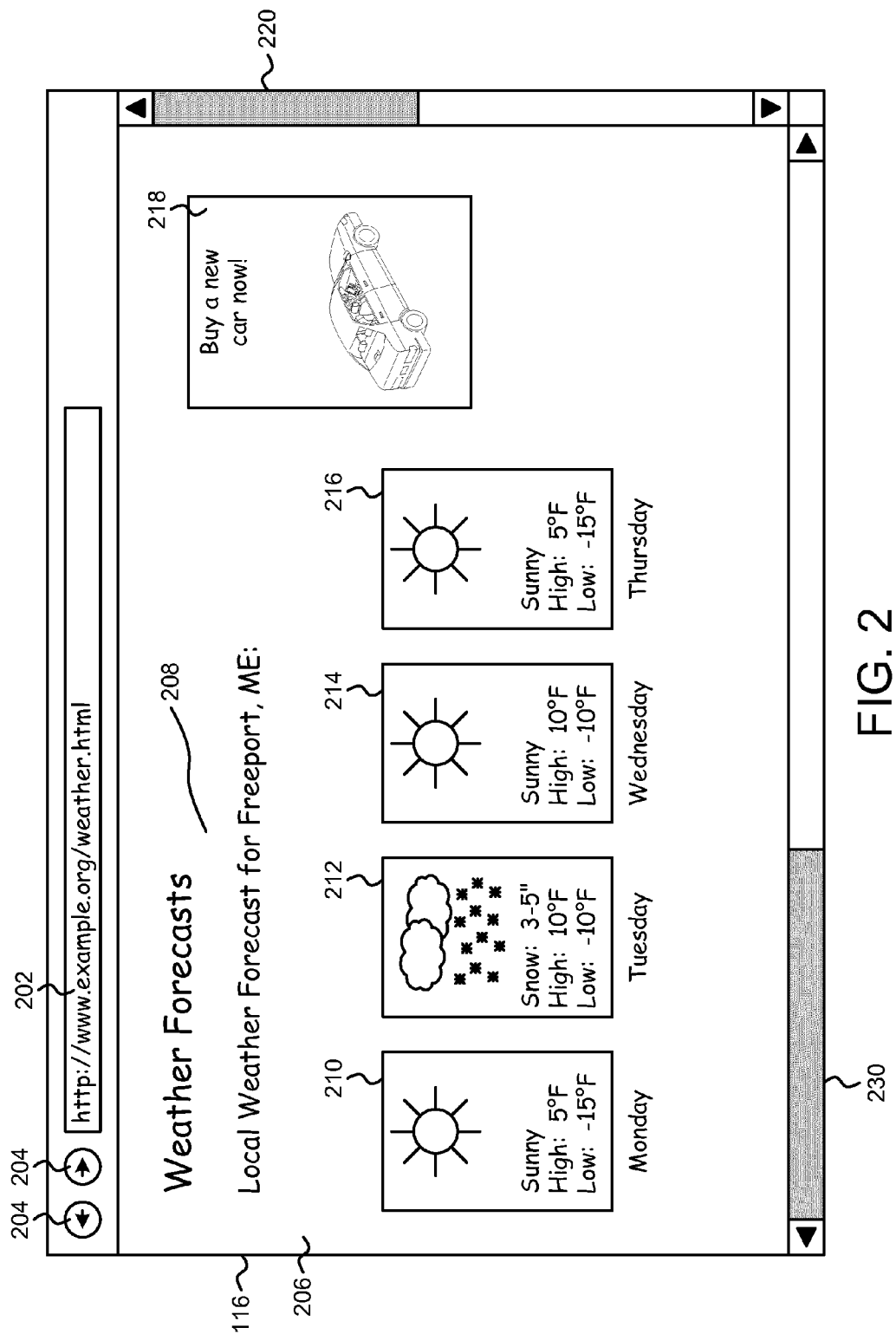
FIG. 2 is an illustration of an electronic display showing an example web page, in accordance with an aspect of the present disclosure.

FIG. 2 is an illustration of an electronic display showing an example web page, in accordance with an aspect of the present disclosure. Referring now to FIG. 2, an illustration is shown of electronic display 116 displaying an example web page 206. Electronic display 116 is in electronic communication with processor 112 which causes visual indicia to be displayed on electronic display 116. For example, processor 112 may execute a web browser or other application stored in memory 114 of client 102 to display indicia of content received by client 102 via network 106. In various implementations, electronic display 116 may be located inside or outside of the same housing as that of processor 112 and/or memory 114. For example, electronic display 116 may be an external display, such as a computer monitor, television set, or any other stand-alone form of electronic display. In other examples, electronic display 116 may be integrated into the housing of a laptop computer, mobile device, or other form of computing device having an integrated display.

As shown, processor 112 may execute a web browser application and provide display data to electronic display 116. In one implementation, the web browser application may operate by receiving input of a uniform resource locator (URL) via a field 202, from an input device (e.g., a pointing device, a keyboard, a touch screen, etc.). For example, the URL, http://www.example.org/weather.html, may be entered into field 202. Processor 112 may use the inputted URL to request data from a content source having a network address that corresponds to the entered URL. In response to the request, the content source may return web page data and/or other data to client 102 which may be used by client 102 to cause visual indicia to be displayed by electronic display 116.

In general, web page data may include text, hyperlinks, layout information, and other data that may be used to provide the framework for the visual layout of displayed web page 206. In some implementations, web page data may be one or more files of web page code written in a markup language, such as the hypertext markup language (HTML), extensible HTML (XHTML), extensible markup language (XML), or any other markup language. For example, the web page data in FIG. 2 may include a file, "weather.html" provided by the website, "www.example.org." The web page data may include data that specifies where indicia appear on web page 206, such as text 208. In some implementations, the web page data may also include additional URL information used by the client device to retrieve additional indicia displayed on web page 206. For example, the file, "weather.html," may also include one or more instructions used by processor 112 to retrieve images 210-216 from the content source. In one implementation the images 210-216 may be implemented in GIF or JPEG. In one implementation, the images 210-216 may be pixels (codes or scripts) that can be fired, as described above, once loaded.

The web browser displayed on electronic display 116 may include a number of navigational controls associated with web page 206. For example, the web browser may include the ability to go back or forward to other web pages using inputs 204 (e.g., a back button, a forward button, etc.). The web browser may also include one or more scroll bars 220, 230, which can be used to display parts of web page 206 that are currently off-screen. For example, web page 206 may be formatted to be larger than the screen of electronic display 116. In such a case, the one or more scroll bars 220, 230 may be used to change the vertical and/or horizontal position of web page 206 on electronic display 116.

Web page 206 may include text, images, or other forms of indicia to convey information to a user of client 102. For example, text 208 may indicate that web page 206 provides information about the weather forecast for Freeport, Me. Similarly, images 210-216 may provide information about the latest weather forecast. For example, image 210 may indicate that the weather is predicted to be sunny on Monday, while image 212 may indicate that snow is predicted for Tuesday. Any combination of text, images, and/or other files may be used by web page 206 to convey information to a user. For example, the weather forecast for Tuesday may be conveyed via text, instead of via image 212.

In one implementation, web page 206 may be configured to include content 218 selected based on a user identifier associated with client 102. In other words, web page 206 may include content 218 when visited by client 102 and different content when visited by another device. In some implementations, one or more content tags may be embedded into the web page code located in the file "weather.html" and/or in other files of web page 206. For example, "weather.html" may include a content tag that specifies that a content field is to be located at the position of content 218. Another content tag may cause processor 112 to request content when web page 206 is loaded, such as content from ID matcher 104. Such a request may include one or more keywords, a client identifier for client 102, or other data used by ID matcher 104 to select content to provide to client 102 and in conjunction with web page 206. In response, ID matcher 104 may select content 218. In some cases, ID matcher 104 may provide content 218 to client 102. In other cases, ID matcher 104 may send a command to client 102 that causes client 102 to retrieve content 218 from a local memory or from a networked content source. In this way, different content may be placed in the location of content 218 on web page 206, based on the device visiting web page 206.

Figure 3:
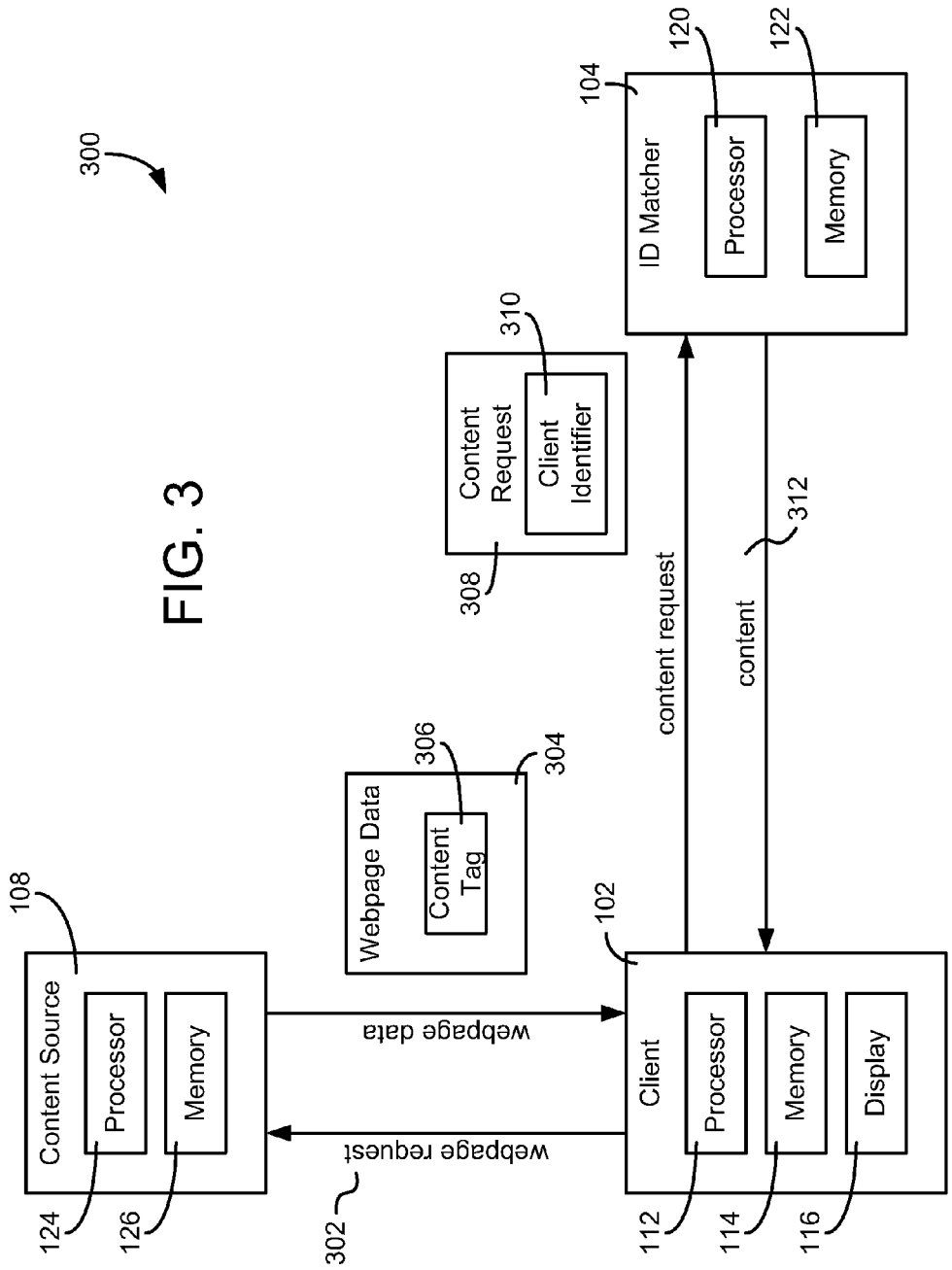
FIG. 3 is an example illustration of content being included on a web page by a ID matcher, in accordance with an aspect of the present disclosure.

FIG. 3 is an example illustration of content 312 being selected or returned by an ID matcher 104 for inclusion with a web page by a process 300, in accordance with an aspect of the present disclosure. As shown, client 102 may send a web page request 302 to a content source via network 106, such as content source 108. For example, web page request 302 may be a request that conforms to the hypertext transfer protocol (HTTP), such as the following:

GET /weather.html HTTP/1.1
Host: www.example.org

Such a request may include the name of the file to be retrieved, weather.html, as well as the network location of the file, www.example.org. In some cases, a network location may be an IP address or may be a domain name that resolves to an IP address of content source 108. In one implementation, a client identifier, such as a cookie associated with content source 108, may be included with web page request 302 to identify client 102 to content source 108. In one implementation, the web page request 302 may be a pixel firing request as discussed above.

In response to receiving web page request 302, content source 108 may return web page data 304, such as the requested file, "weather.html." Web page data 304 may be configured to cause client 102 to display a web page on electronic display 116 when opened by a web browser application. In some cases, web page data 304 may include code that causes client 102 to request additional files to be used as part of the displayed web page. For example, web page data 304 may include an HTML image tag of the form:

<img src="Monday_forecast.jpg">

Such code may cause client 102 to request the image file "Monday_forecast.jpg," from content source 108. In one implementation, what may be returned is confirmation that a particular pixel has been fired, thereby giving credit to the domain owner that loaded an image on the webpage, for example.

In some implementations, web page data 304 may include content tag 306 configured to cause client 102 to retrieve content, such as an advertisement or pixel request, from ID matcher 104. In some cases, content tag 306 may be an HTML image tag that includes the network location of ID matcher 104. In other cases, content tag 306 may be implemented using a client-side scripting language, such as JavaScript, or PHP, Ruby, PERL, ASP. For example, content tag 306 may be of the form:

<script type='text/javascript'>
AdNetwork_RetrieveAd("argument")
</script> where AdNetwork_RetrieveAd is a script function that causes client 102 to send a content request 308 to ID matcher 104. In some cases, the argument of the script function may include the network address of ID matcher 104, the referring web page, and/or additional information that may be used by cookie auction matcher 104 to select content to be included with the web page or information to be sent to domain owners.

According to one implementation, the user of client 102 may elect to receive certain content determined to be relevant to the user. In such a case, content request 308 may include a client identifier 310, used by ID matcher 104 to identify client 102 and/or a user identifier associated with client 102. In various implementations, client identifier 310 may be an HTTP cookie previously set by ID matcher 104 on client 102, the IP address of client 102, a unique device serial for client 102, other forms of identification information, or combinations thereof. For example, ID matcher 104 may set an identifier such as a cookie that includes a unique string of characters on client 102 when content is first requested by client 102 from ID matcher 104. Such a cookie may be included in subsequent content requests sent to ID matcher 104 by client 102.

In some implementations, client identifier 310 may be used by ID matcher 104 to store signal data indicative of online actions performed using client 102. For example, content request 308 may include data relating to which web page was requested by client 102, when the web page was requested, and/or other browsing history data. In this way, ID matcher 104 is able to reconstruct at least a portion of the online history of client 102. In some implementations, ID matcher 104 may also receive signal data from other entities that do not include content selected by ID matcher 104. For example, a website that does include content from ID matcher 104 may nonetheless provide information about client 102 visiting the website to ID matcher 104.

In some cases, client identifier 310 may be sent to ID matcher 104 when the user of client 102 performs certain online actions. For example, web page data 304 may include a query that causes client 102 to send client identifier 310 to ID matcher 104 when the user selects a displayed piece of content. Client identifier 310 may also be used to store information about client 102 being redirected to another web page. For example, client 102 may be redirected to a domain owner's website if the user selects a displayed content. In such a case, client identifier 310 may also be used to record which actions were performed on the domain owner's website. For example, client identifier 310 may be sent to ID matcher 104 when the user of client 102 navigates the domain owner's website. In this way, data regarding whether the user searched for a product, added a product to a shopping cart, completed a purchase on the domain owner's website, etc., may also be stored by ID matcher 104.

ID matcher 104 may use signal data for the user identifier associated with client 102 to determine how similar the user identifier is to a set of one or more other user identifiers. In various implementations, ID matcher 104 may use statistical analysis on signal data associated with the set to determine the strength of association between a signal and the set. For example, if 85% of user identifiers in the set visited a particular web page, this signal may be weighted highly. ID matcher 104 may apply signal weights to the signals for the user identifier associated with client 102. The signal weights may then be used to determine a measure of similarity between the user identifier associated with client 102 and that of the set.

In response to receiving content request 308, ID matcher 104 may select content 312 to be returned to client 102 based on the matched cookies for its associated user identifier. In one implementation, a domain owner may participate in an auction to provide content to client 102. For example, a domain owner may specify a set of one or more user identifiers and utilize ID matcher 104 to determine a match between identifiers such as cookies from the one set to that of the user identifier for client 102. If an auction process is used by ID matcher 104 to select content for client 102, the domain owner's bid in the auction may be based on the determined cookie match. For example, assume that the set of user identifiers specified by the domain owner is associated with buying a particular product. If the signals for the user identifier associated with client 102 are similar to that of the set, the advertiser may bid in an algorithmic model such as an auction to provide content 312 to client 102. In one implementation, the auction may be a second-priced auction, as described previously above. In one implementation, the auction may be a Vickrey auction, as described previously above. In one implementation, the auction returns a matched set of identifiers such as cookies instead of content 312.

Figure 4:
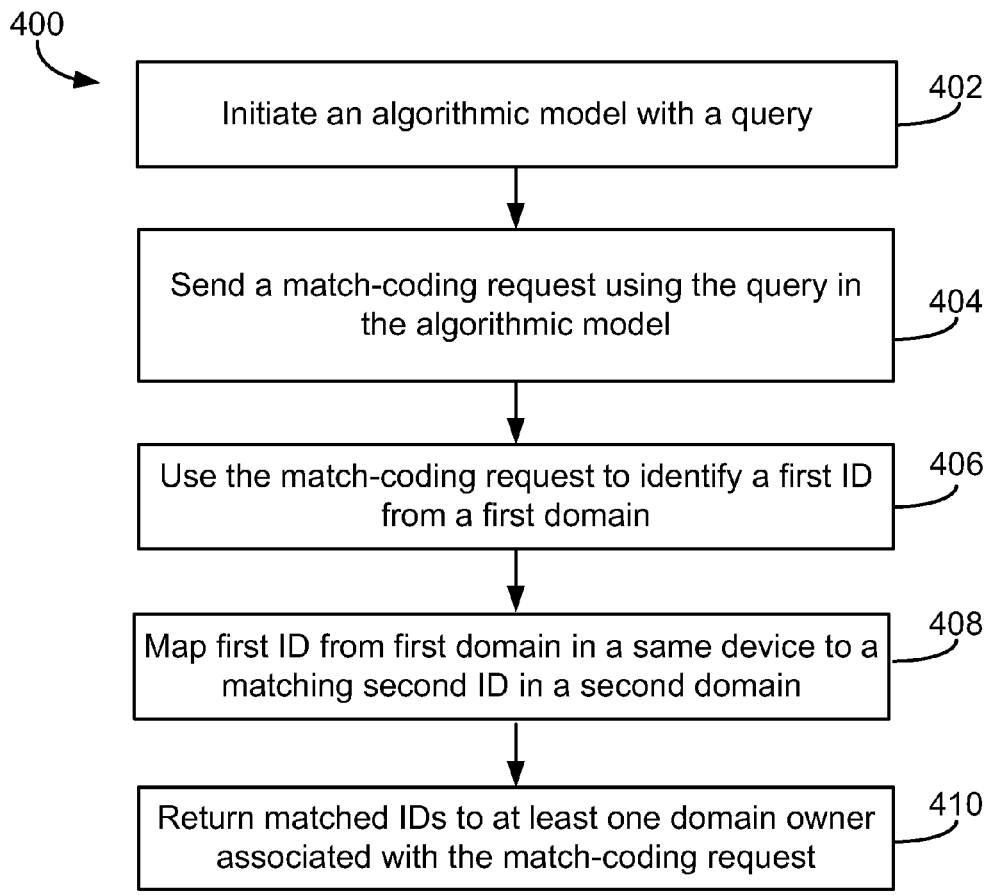
FIG. 4 is an example process for matching identifiers in an algorithmic model, in accordance with an aspect of the present disclosure.

FIG. 4 is an example process for matching identifiers in an auction, in accordance with an aspect of the present disclosure. Process 400 may be performed in any order and is not limited to the order shown in FIG. 4. In box 402, an algorithmic model is initiated with a query. The algorithmic model can be, for example, an auction, a rate card, or another model that measures identifiers based on any dimension or parameter. The query may be, for example, content tag 306 in FIG. 3, or a script (such as java script) or an image redirect protocol. In one implementation, the query obfuscates, hides or blocks the identity of the referrer domain owner on which that query resides. In one implementation, this may be implemented in a content exchange system by creating a special format of a query with a wrapper code that masks the referral domain owner host, or masks the portion of the query (code or otherwise) that identifies the referral domain owner. The query may also be tied to an algorithmic model such as an auction for a unique identifier such as a cookie, having an ID, that is associated with that particular page view, of a webpage expressed by webpage data 304, for example. In one implementation, the algorithmic model such as an auction may be similar to a content exchange process that provides for the bidded buying and selling of content. In one implementation, the auction may be a second-price auction with a price floor, as discussed above. In one implementation, the auction may be a Vickrey auction, or a sealed second-price auction, as discussed above.

In box 404, a match-coding request is sent using the query in the algorithmic model, as discussed above in box 402. In one implementation, the match-coding request may sent a pixel, and a pixel may be a small piece of code or a script that is placed on a given confirmation page of a webpage (e.g. associate with webpage data 304, for example), usually in the form of content. In one implementation, the content may comprise an advertisement. Invisible image pixels are the most basic type of code. When the image is loaded on the webpage, the server is informed of the image loading on the confirmation page and a domain owner (e.g., such as an affiliate or publisher) may get rewarded for the lead that caused the loading of that image. In one implementation, the code that makes up the pixel may not necessarily be an invisible image such as a GIF or JPEG picture, but may also be in JavaScript, any script, and/or any other HTTP accessible language such as, for example, PHP, Ruby, PERL, ASP, XML, Java and so on. Therefore, when a pixel "fires" it successfully sends back information on the successfully completed transaction (e.g., an image loading or a script executing) to the domain owner so that the domain owner may receive credit for that transaction. In one implementation, the information of the successfully completed transaction may include any account number belonging to the domain owner, the date and time of the transaction, the IP address of the user or visitor loading the confirmation page, and the amount of commission earned from a successful referral. Therefore in box 402, a match-coding pixel may be fired according to the above-described process but utilizing a query that obfuscates the identity of the referral domain owner. Then, the auction process discussed in box 402 begins that uses this fired match-coding pixel request also with the query that obfuscates the identity of the referral domain owner.

In box 406, the match-coding request is used to identify a first identifier (ID) from a first domain. In one implementation, the first ID may include any URL, domain identifier, number index, hashtag, code, or any other type of identification. In one implementation, a domain is a URL such as www.*****.com. In one implementation, a domain owner can include a domain identifier and a local name, and the domain identifier may include at least one of a URL, a number index, a hashtag, a code, or any other type of identification as discussed above. In one implementation, each ID may correspond to their own domain. In one implementation, the ID may be a cookie ID affiliated with a cookie, a device ID affiliated with a device, a user ID affiliated with a user, or partner ID affiliated with a partner and supplied by a partner that may be a domain owner participating in the algorithmic model for compensation. In one implementation, the algorithmic model (such as an auction) may allow bidders or domain owners to fill in gaps in their ID domain mappings by using IDs or cookies that correspond to fired match-coding pixels having queries that obfuscate the identity of the referral domain owner and instead rely on an ID matching process in the respective algorithmic model.

In box 408, the first ID from the first domain is mapped in the same device, or same browser, to a second ID in a second domain. In one implementation, this mapping and matching process may utilize a search through all the other domains of the browser or device until a match is found and then perform the mapping. In one implementation, this mapping and matching process may utilize an efficient search through all the other domains of the browser or device for the most likely match, and, once the match is found, then perform the mapping. In one implementation, the matching may be performed by data lookup in a table or hash-table storing all the values, which may be an instantaneous or very quick action.

In one implementation, the number of match-coding requests or pixel fires may be capped at a frequency maximum and different compensation thresholds may be set for different bidders or domain owners. In one implementation, the match-coding requests or pixel fires can be frequency capped at a predetermined number so that users are not inundated with the same match-coding requests over and over again. In one implementation, different compensation thresholds or minimums may be set for different bidders in terms of compensation in order to ensure a particular domain owner receives at least a certain amount of compensation for a successfully referred match-coding request transaction.

In box 410, the matched IDs are returned to at least one domain owner associated with the match-coding request. The matched IDs can then be used to trace back to the initial referrers of the content conveniently and award them accordingly, based on a minimum compensation threshold or amount, such as described above. As a result, domain owners are directly rewarded with potential compensation in an efficient and quick manner without wasting pixel firing requests that slow down latency or without having to purchase content inventory. However, the compensation is potential in that it is not guaranteed, and dependent on the success of various factors, such as, for example, whether the match-coding requests successfully go through. In one implementation, the domain owner may be the owner of the first domain having the first ID, the owner of the second domain having the second ID or the owner of any other domain, such as the owner of a third-party domain that administers or operates the identifier matching exchange system. In one implementation, the domain owner may be the owner of the first domain having the first ID or the owner of the second domain having the second ID.

In one implementation, a process is provided that has the steps of: (a) retrieving the first ID of the page a user is on currently on a first domain; (b) configuring a second domain which will be called; (c) calling the second domain; (d) retrieving the second ID of the second domain, and (e) matching the second ID of the called second domain with the first ID of the page on the first domain that the user is currently on, and (f) exporting the matched first and second ID results.

Figure 5:
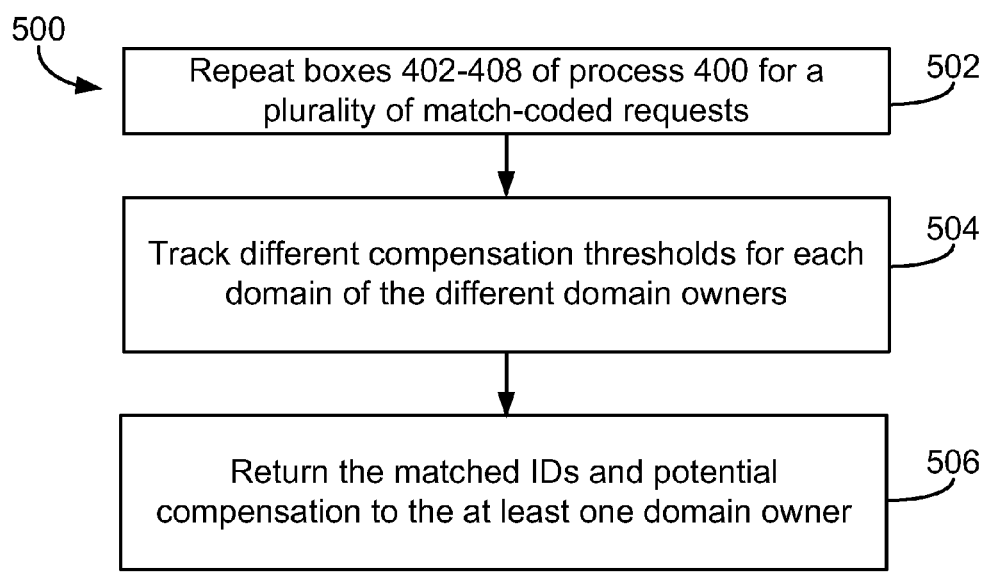
FIG. 5 is another example process for matching identifiers in an algorithmic model, in accordance with an aspect of the present disclosure.

FIG. 5 is another example process for matching identifiers in an auction, in accordance with an aspect of the present disclosure. Process 500 may be performed in any order and is not limited to the order shown in FIG. 5. In box 502, boxes 402-408 of process 400 discussed above in FIG. 4 are performed for a plurality of match-coded requests. In one implementation, the number of match-coding requests may be capped at a frequency maximum. In one implementation, the plurality of match-coding requests may also be verified so as to not contain duplicate or the same requests. For example, the algorithm that performs this verification may eliminate any duplicate requests in excess of a predetermined number, for example 2-3. In box 504, different compensation thresholds are tracked for each domain of the different domain owners, which are different domain owner referrers. In box 506, the matched IDs (matched from box 402-408 of process 400) are returned to each bidder or referrer domain owner. Also in box 506, any potential compensation that a domain owner is entitled to is provided to that domain owner. In one implementation, the potential compensation amount adheres to the minimum compensation amount according to the thresholds determined in box 504. In this case, the referrer domain owners receive exactly what they have earned in an efficient manner.

In one implementation, identifiers or IDs can include cookie IDs, device IDs, user IDs, or partner IDs. In one implementation, algorithmic models can include at least one of an auction, a rate card, and a model based on dimensions of the IDs. In one implementation, the the query includes at least one of a script (such as java script or another type of code) and an image re-direct protocol. In one implementation, the match coding request can correspond to a match coding pixel request where a pixel is fired. In one implementation, the domain owner can include a content provider, a publisher, an affiliate, or partner.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus or processing circuit on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method for cross-domain matching of identifiers, comprising:
    initiating, using one or more processors, on a first domain, an algorithmic model with a query, the algorithmic model associated with an identifier matching auction providing mappings of identifiers, the first domain associated with a domain owner;
    determining, using the one or more processors, a first identifier associated with a page view of a webpage displayed by a device in the first domain;
    sending, over a first network, a match-coding request using the query in the algorithmic model, the match-coding request including the first identifier, and the match-coding request requesting for a mapping of the first identifier to another identifier in another domain;
    in response to sending the match-coding request, receiving a second identifier determined by the identifier matching auction to map to the first identifier, the second identifier associated with a second domain; and
    providing the first identifier and the second identifier to a computing device associated with a content provider.

2. The method of claim 1, further comprising:
    receiving data identifying domain owner compensation provided for identification of the second identifier using the match-coding request, the data including compensation amount.

3. The method of claim 1, wherein the query is invoked by a pixel located on the webpage, the pixel being an image that is one pixel by one pixel in size.

4. The method of claim 1, wherein the query is a script.

5. The method of claim 1, wherein the first identifier comprises one of a device identifier, a cookie identifier, a partner identifier, or a user identifier.

6. The method of claim 1, further comprising:
    capping, via the one or more processors, a number of match-coding requests on the first domain according to a predetermined frequency maximum.

7. The method of claim 1, further comprising:
    setting, via the one or more processors, compensation minimum thresholds for the domain owner, the compensation minimum thresholds provided by the domain owner.

8. The method of claim 1, wherein the query includes a wrapper code configured to mask a domain owner identification part.

9. The method of claim 3, wherein sending, over the first network, the match-coding request using the query in the algorithmic model comprises:
    loading, via the one or more processors, a code, the code comprising one of a graphics interface format (GIF) image, a joint photographic experts group (JPEG) image, a JavaScript script, a PHP script, a Ruby script, a PERL script, or an ASP script;
    determining, via the one or more processors, if the code has been loaded; and
    sending, via the one or more processors, a confirmation that the code has been loaded if it has been loaded.

10. The method of claim 1, wherein a domain identifier and a local name are associated with the domain owner, and the domain identifier comprises one of a URL, a number index, a hashtag, a code, or any other type of identification.

11. A non-transitory tangible computer-readable storage medium having instructions thereon that cause one or more processors to perform operations, the operations comprising:
    initiating on a first domain an algorithmic model with a query, the algorithmic model associated with an identifier matching auction providing mappings of identifiers, the first domain associated with a domain owner;
    determining a first identifier associated with a page view of a webpage displayed by a device in the first domain;
    sending a match-coding request using the query in the algorithmic model, the match-coding request including the first identifier, and the match-coding request requesting for a mapping of the first identifier to another identifier in another domain;
    in response to sending the match-coding request, receiving a second identifier determined by the identifier matching auction to map to the first identifier, the second identifier associated with a second domain; and
    providing the first identifier and the second identifier to a computing device associated with a content provider.

12. The non-transitory tangible computer-readable storage medium of claim 11, wherein the query is invoked by a pixel located on the webpage, the pixel being an image that is one pixel by one pixel in size.

13. The non-transitory tangible computer-readable storage medium of claim 11, wherein the query is a script.

14. The non-transitory tangible computer-readable storage medium of claim 11, wherein the first identifier comprises one of a device identifier, a cookie identifier, a partner identifier, or a user identifier.

15. A system having at least one memory unit configured to store processor executable instructions, and one or more processors configured to execute the processor executable instructions to:
    initiate on a first domain an algorithmic model with a query, the algorithmic model associated with an identifier matching auction providing mappings of identifiers, the first domain associated with a domain owner;
    determine a first identifier associated with a page view of a webpage displayed by a device in the first domain;
    send a match-coding request using the query in the algorithmic model, the match-coding request including the first identifier, and the match-coding request requesting for a mapping of the first identifier to another identifier in another domain;
    in response to sending the match-coding request, receive a second identifier determined by the identifier matching auction to map to the first identifier, the second identifier associated with a second domain; and
    provide the first identifier and the second identifier to a computing device associated with a content provider.

16. The system of claim 15, further configured to:
receive data identifying domain owner compensation provided for identification of the second identifier using the match-coding request, the data including compensation amount.

17. The system of claim 15, further configured to:
cap a number of match-coding requests on the first domain according to a predetermined frequency maximum; and
set compensation minimum thresholds for the domain owner, the compensation minimum thresholds provided by the domain owner.

* * * * *